(12) United States Patent
De Shon

(10) Patent No.: US 6,195,991 B1
(45) Date of Patent: Mar. 6, 2001

(54) BUOYANCY ENGINE FOR CAPTURING UNDERSEA GAS

(76) Inventor: Denis Alan De Shon, 7242 Seven Oaks Ave., Baton Rouge, LA (US) 70806

( * ) Notice: Subject to any disclaimer, the term of this patent is extended or adjusted under 35 U.S.C. 154(b) by 0 days.

(21) Appl. No.: 09/476,705

(22) Filed: Dec. 30, 1999

(51) Int. Cl.[7] .................................................... F03C 1/00
(52) U.S. Cl. ................................................ 60/495; 60/496
(58) Field of Search ....................................... 60/495, 496

(56) References Cited

U.S. PATENT DOCUMENTS

| | | | |
|---|---|---|---|
| 257,505 | * | 5/1882 | McMillan et al. ............... 60/495 X |
| 4,333,311 | * | 6/1982 | Kitabayashi .......................... 60/496 |
| 4,675,536 | * | 6/1987 | Bellamy ............................. 60/495 X |
| 4,981,015 | * | 1/1991 | Simpson ............................. 60/495 X |

* cited by examiner

*Primary Examiner*—Hoang Nguyen

(57) ABSTRACT

A buoyancy engine is mounted on the sea floor above a natural gas vent. The engine captures emitted gas in a ring containing gas holding spaces. The gas imparts buoyant energy which is converted into rotational force as the gas ascends thru the apparatus, and the ring rotates. The ring is attached to a driveshaft mounted on bearings in the walls of the apparatus, and turns an electric generator.

1 Claim, 2 Drawing Sheets

BUOYANCY ENGINE FOR CAPTURING UNDERSEA GAS

BACKGROUND OF THE INVENTION

1. Field of the Invention

This invention relates generally to buoyancy engines, and, more particularly, to one which is disposed on the sea floor to capture gas emitted by the earth. Buoyant gas is captured in the apparatus, which rotates a generator to convert the buoyant energy into electricity.

2. Description of the Prior Art

There have been various designs for buoyancy engines which show alternative approaches to capturing a gas in a liquid environment.

| Name | Patent No. |
|---|---|
| De Shon | 4,683,720 |
| De Shon | 4,713,937 |
| De Shon | 4,742,242 |
| De Shon | 4,865,723 |

But, none have addressed the employment of a buoyancy engine in a subsea environment to capture naturally occurring gas emissions from sea vents and the like.

SUMMARY OF THE INVENTION

The invention is a buoyancy engine comprised of a plurality of gas holding spaces incorporated into a ring attached to a driveshaft which is supported on sealed bearings in the walls of the apparatus. The apparatus is mounted on the sea floor above vents in the sea floor. Gas, naturally occurring from pressures within the earth, spews from these vents. This gas is directed into the apparatus by a collector, and is introduced into the gas holding spaces at the 180 degree position of the ring. The gas holding spaces, filled sequentially with gas, ascend due to buoyant force, and impart a rotary motion to the driveshaft, which drives the electric generator attached to the other end of the driveshaft producing electricity. The gas holding spaces release the gas contained as they pass through the 360 degree positon. The ring and arms are sheathed with a hydrodynamically styled skin to reduce friction in the apparatus. All components are designed of materials resistant to heat and corrosion from both the salt in the seawater and the corrosive components of the gas captured.

OBJECTS AND ADVANTAGES OF THE INVENTION

It is an object of the invention to provide a buoyancy engine of this character which capitalizes on the buoyant power released in gases emitting from the sea floor by capturing these gases in the gas holding spaces of a rotable ring to provide power to generate electricity by rotating an electric generator.

It is another object of the invention to provide apparatus of this character that is simple in construction and operation.

It is a further object of the invention to provide apparatus of this character that is relatively inexpensive to manufacture and maintain.

The characteristics and advantages of the invention are further sufficiently referred to in connection with the following detailed description of the accompanying drawings, which represent one embodiment.

After considering this example, skilled persons will understand that many variations may be made without departing from the principles disclosed and I contemplate that employment of any structure, arrangements or modes of operation that are properly within the scope of the appended claims.

BRIEF DESCRIPTION OF THE DRAWINGS

Referring to the drawings, which are for illustrative purposes only.

DESCRIPTION OF THE PRESENT EMBODIMENT

Figure 1:
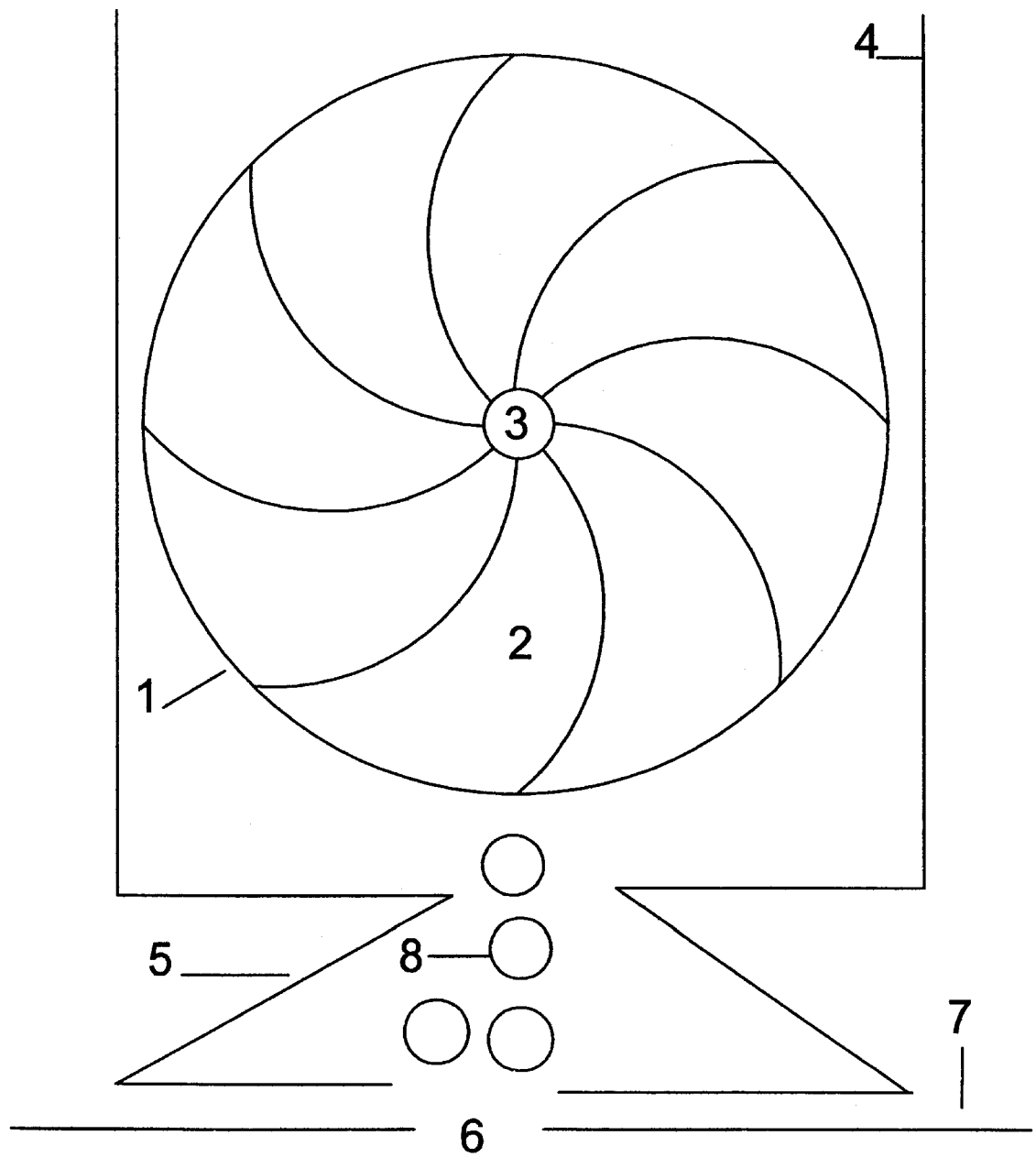
FIG. 1 is a schematic side view of the apparatus embodying the present invention, showing detail of the driveshaft, gas holding spaces, collector and walls.

Referring to the drawings, in FIG. 1 there is shown apparatus embodying the present invention. A ring (1), containing gas holding spaces (2) is attached to a driveshaft (3) which is rotably mounted in the wall (4) of the apparatus. Below the ring is a collector (S) which is positioned above a gas emitting sea vent (6) on the sea floor (7). The gas (8) is directed into the apparatus at the 180 degree position of the ring. The buoyant force of the gas (8) causes the ring (1) to rotate upward, imparting a rotational force to the driveshaft (3). Gas, (8) having expended its buoyant force within the apparatus, is discharged at the 360 degree point of the ring.

Figure 2:
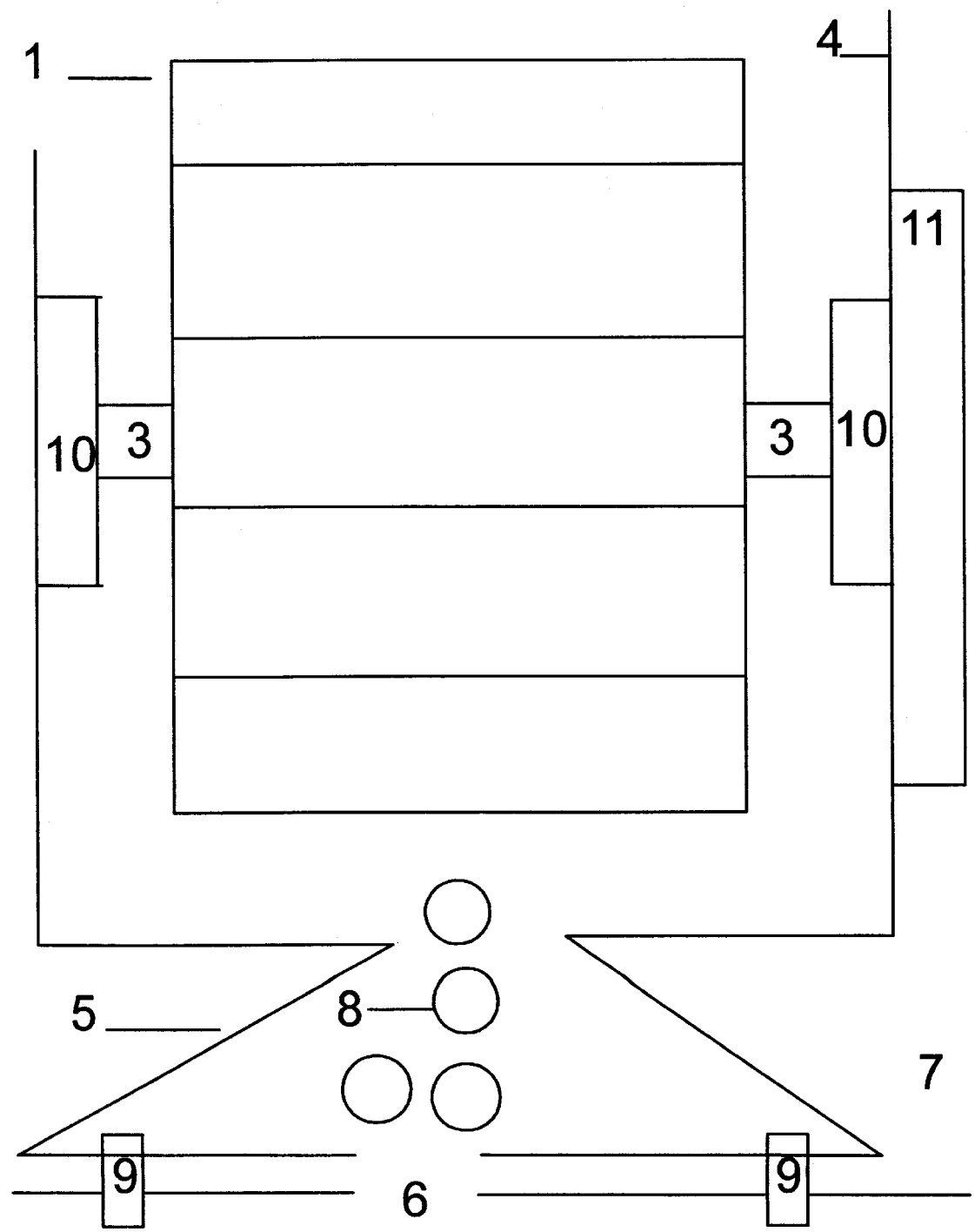
FIG. 2. is a schematic front view of the apparatus embodying the present invention, showing the sealed bearings, attaching points and the generator.

In FIG. 2, are shown the mounting bolts (9) which attach the apparatus to the sea floor. The ring (1) is attached to the driveshaft (3) and is mounted in sealed bearings (10) in the wall (4) of the apparatus. The driveshaft (3) is connected to, and rotates, the electric generator (11) producing electricity which is directed to the desired use. The invention and its attendant advantages will be understood from the foregoing description and it will be apparent that various changes may be made in the form, construction and arrangement of the parts without departing from the spirit or scope thereof or sacrificing its material advantages, the arrangement hereinbefore being merely by way of example.

I, additionally, visualize that this apparatus may also be attached to the underwater structure of an offshore oilfield drilling rig, to allow pressurized gas, developed from the drilling process, to be captured in the apparatus before its venting in the normal manner, thus providing an auxiliary power source.

I do not wish to be restricted to the specific form shown or uses mentioned except as defined in the accompanying claims.

I claim:

1. A buoyancy engine, positioned on the sea floor with mounting bolts, above a sea floor gas vent which emits high pressure gas naturally due to the forces within the earth's core, with a collector positioned to capture these gaseous emissions and funnel them into a ring containing gas holding spaces which is rotably mounted on a driveshaft, and which driveshaft is mounted in sealed bearings in the walls of the apparatus, and as a result of the conversion of buoyant force into rotable force, turns an electric generator.

\* \* \* \* \*